United States Patent
Meredith et al.

(10) Patent No.: US 9,008,698 B2
(45) Date of Patent: Apr. 14, 2015

(54) LOCATION ANALYTICS EMPLOYING TIMED FINGERPRINT LOCATION INFORMATION

(71) Applicant: AT&T Mobility II LLC, Atlanta, GA (US)

(72) Inventors: Sheldon Meredith, Marietta, GA (US); Brandon Hilliard, Woodstock, GA (US); Mario Kosseifi, Roswell, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

(21) Appl. No.: 14/279,176

(22) Filed: May 15, 2014

(65) Prior Publication Data
US 2014/0248904 A1     Sep. 4, 2014

Related U.S. Application Data

(63) Continuation of application No. 13/188,345, filed on Jul. 21, 2011, now Pat. No. 8,761,799.

(51) Int. Cl.
*H04W 4/00* (2009.01)
*H04W 24/00* (2009.01)
(Continued)

(52) U.S. Cl.
CPC ............. *H04W 4/021* (2013.01); *H04W 12/06* (2013.01); *H04L 63/107* (2013.01); *H04W 64/00* (2013.01); *G01S 5/0252* (2013.01)

(58) Field of Classification Search
CPC ... G01S 5/0252; H04L 63/107; H04W 12/06; H04W 4/021; H04W 64/00
USPC .......... 455/456.1, 456.2, 456.3, 456.4, 456.5, 455/456.6, 422.1
See application file for complete search history.

(56) References Cited

U.S. PATENT DOCUMENTS

| 4,718,081 A | 1/1988 | Brenig |
| 5,515,062 A | 5/1996 | Maine et al. |

(Continued)

FOREIGN PATENT DOCUMENTS

| EP | 0856746 A2 | 8/1998 |
| JP | 2004069609 A | 3/2004 |

(Continued)

OTHER PUBLICATIONS

Notice of Allowance dated Aug. 21, 2014 for U.S. Appl. No. 13/447,069, 78 pages.

(Continued)

*Primary Examiner* — Opiribo Georgewill
(74) *Attorney, Agent, or Firm* — Amin, Turocy & Watson, LLP

(57) ABSTRACT

The disclosed subject matter provides for employing timed fingerprint location information in location analytics. Timed fingerprint location information can provide a location for a user equipment. The location of the user equipment can be compared to a location analytics rule related to the location of a user equipment. Where the location satisfies a condition of the location analytics rule, the user equipment can be associated with a compliance status. Compliance, or noncompliance, can initiate further action. Further action can include reporting the compliance status, verifying the identity of a user associated with the user equipment, enforcing the location analytics rule, etc. Enforcing the location analytics rule can include alerts, fines, reporting to an authority figure or agency, etc.

20 Claims, 10 Drawing Sheets

(51) Int. Cl.
*H04W 4/02* (2009.01)
*H04W 12/06* (2009.01)
*H04L 29/06* (2006.01)
*H04W 64/00* (2009.01)
*G01S 5/02* (2010.01)

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,844,521 A | 12/1998 | Stephens et al. |
| 5,982,324 A | 11/1999 | Watters et al. |
| 6,018,312 A | 1/2000 | Haworth |
| 6,026,301 A | 2/2000 | Satarasinghe |
| 6,108,532 A | 8/2000 | Matsuda et al. |
| 6,108,556 A | 8/2000 | Ito |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,298,233 B1 | 10/2001 | Souissi et al. |
| 6,307,503 B1 | 10/2001 | Liu et al. |
| 6,311,078 B1 | 10/2001 | Hardouin |
| 6,317,686 B1 | 11/2001 | Ran |
| 6,330,459 B1 | 12/2001 | Crichton et al. |
| 6,351,235 B1 | 2/2002 | Stilp |
| 6,353,778 B1 | 3/2002 | Brown |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,933,100 B2 | 8/2005 | Igawa et al. |
| 6,933,860 B1 | 8/2005 | Gehman et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,432,829 B2 | 10/2008 | Poltorak |
| 7,436,794 B2 | 10/2008 | Takahashi et al. |
| 7,508,321 B2 | 3/2009 | Gueziec et al. |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | Mcnair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,054,802 B2 | 11/2011 | Burgess et al. |
| 8,121,604 B1 | 2/2012 | Schwinghammer |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,307,030 B1 | 11/2012 | Hu |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,548,494 B2 | 10/2013 | Agarwal et al. |
| 8,594,700 B2 | 11/2013 | Nabbefeld |
| 8,666,388 B2 | 3/2014 | Catovic et al. |
| 8,666,390 B2 | 3/2014 | Meredith et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0092448 A1 | 5/2003 | Forstrom et al. |
| 2003/0097330 A1 | 5/2003 | Hillmer et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzold et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0240839 A1 | 10/2006 | Chen et al. |
| 2006/0267841 A1 | 11/2006 | Lee et al. |
| 2006/0270419 A1 | 11/2006 | Crowley et al. |
| 2006/0282660 A1 | 12/2006 | Varghese et al. |
| 2007/0001873 A1 | 1/2007 | Ishikawa |
| 2007/0060130 A1 | 3/2007 | Gogic et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |

(56) References Cited

U.S. PATENT DOCUMENTS

| | | | |
|---|---|---|---|
| 2008/0004789 A1 | 1/2008 | Horvitz et al. |
| 2008/0010365 A1 | 1/2008 | Schneider |
| 2008/0039114 A1 | 2/2008 | Phatak et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0024546 A1 | 1/2009 | Ficcaglia et al. |
| 2009/0052330 A1 | 2/2009 | Matsunaga et al. |
| 2009/0079622 A1 | 3/2009 | Seshadri et al. |
| 2009/0104917 A1 | 4/2009 | Rached et al. |
| 2009/0117907 A1 | 5/2009 | Wigren |
| 2009/0131073 A1 * | 5/2009 | Carlson et al. | 455/456.1 |
| 2009/0181695 A1 | 7/2009 | Wirola et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0310501 A1 | 12/2009 | Catovic et al. |
| 2009/0327134 A1 | 12/2009 | Carlson et al. |
| 2010/0020776 A1 | 1/2010 | Youssef et al. |
| 2010/0054237 A1 | 3/2010 | Han et al. |
| 2010/0058442 A1 | 3/2010 | Costa et al. |
| 2010/0081389 A1 | 4/2010 | Lawrow et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi |
| 2010/0172259 A1 | 7/2010 | Aggarwal et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 * | 9/2010 | Cook et al. | 455/411 |
| 2010/0250542 A1 | 9/2010 | Fujimaki |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0072034 A1 | 3/2011 | Sly |
| 2011/0076975 A1 | 3/2011 | Kim et al. |
| 2011/0077032 A1 | 3/2011 | Correale et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schr der et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0158289 A1 | 6/2012 | Brush et al. |
| 2012/0182874 A1 | 7/2012 | Siomina et al. |
| 2012/0287911 A1 | 11/2012 | Takano et al. |
| 2012/0317500 A1 | 12/2012 | Kosseifi et al. |
| 2012/0323703 A1 | 12/2012 | Hillier et al. |
| 2013/0007058 A1 | 1/2013 | Meredith et al. |
| 2013/0023237 A1 | 1/2013 | Meredith et al. |
| 2013/0023274 A1 | 1/2013 | Meredith et al. |
| 2013/0023281 A1 | 1/2013 | Meredith et al. |
| 2013/0281111 A1 | 10/2013 | Syrjarinne et al. |
| 2013/0324149 A1 | 12/2013 | Fix et al. |
| 2014/0062782 A1 | 3/2014 | Abraham |
| 2014/0171060 A1 * | 6/2014 | Cook et al. | 455/419 |

FOREIGN PATENT DOCUMENTS

| | | |
|---|---|---|
| JP | 2007328050 A | 12/2007 |
| WO | WO2006031035 A1 | 3/2006 |

OTHER PUBLICATIONS

Office Action dated Aug. 28, 2014 for U.S. Appl. No. 13/526,988, 83 pages.

Office Action dated Sep. 22, 2014 for U.S. Appl. No. 13/175,199, 62 pages.

Office Action dated Oct. 17, 2014 for U.S. Appl. No. 13/204,535, 47 pages.

Office Action dated Oct. 20, 2014 for U.S. Appl. No. 13/494,959, 64 pages.

Office Action dated Oct. 22, 2014 for U.S. Appl. No. 13/557,425, 59 pages.

Office Action dated Apr. 8, 2014 for U.S. Appl. No. 13/175,199, 52 pages.

Office Action dated Apr. 23, 2014 for U.S. Appl. No. 13/291,917, 29 pages.

Office Action dated Apr. 22, 2014 for U.S. Appl. No. 13/447,069, 51 pages.

Office Action dated Sep. 20, 2012 for U.S. Appl. No. 12/870,254, 29 pages.

Office Action dated May 14, 2014 for U.S. Appl. No. 13/660,689, 62 pages.

Office Action dated May 9, 2014 for U.S. Appl. No. 13/188,136, 33 pages.

Squires, "Practical Physics", Cambridge University Press, p. 12, 1986, 3 pages.

Represent (2000). In Collins English dictionary. Retrieved on May 9, 2014 from http://search.credoreference.com/content/entry/hcengdict/represent/0, 2 pages.

Represent. (2001). In Chambers 21 st century dictionary. Retrieved on May 9, 2014 from http://search.credoreference.com/content/entry/chambdict/represent/0.

Represent. (2011). In The american heritage dictionary of the english language. Retrieved on May 9, 2014 from http://search.credoreference.com/content/entry/hmdictenglang/represent/0.

Non-Final Office Action dated May 20, 2014 for U.S. Appl. No. 13/551,369, 29 pages.

Non-Final Office Action dated May 30, 2014 for U.S. Appl. No. 13/277,595, 49 pages.

Non-Final Office Action dated Jun. 3, 2014 for U.S. Appl. No. 13/523,770, 53 pages.

Non-Final Office Action dated Jun. 6, 2014 for U.S. Appl. No. 13/447,072, 25 pages.

Final Office Action dated Apr. 3, 2014 for U.S. Appl. No. 13/188,295, 37 pages.

Office Action dated Jun. 18, 2014 for U.S. Appl. No. 13/305,276, 26 Pages.

(56) References Cited

OTHER PUBLICATIONS

Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews. com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
"Boser, et al. A training algorithm for optimal margin classifiers. In D. Haussler, editor, 5th Annual ACM Workshop on COLT, pp. 144-152, Pittsburgh, PA, 1992. ACM Press. http://citeseerx.ist.psu.edu/viewdoc/summary?doi=10.1.1.21.3818. Last accessed Dec. 24, 2010, 9 pages.".
"Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.".
"Drucker, et al. Support Vector Regression Machines. http://scholar.google.com/scholar?q=%22Support+Vector+Regression+Machines.%22. Last accessed Dec. 24, 2010, 7 pages.".
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.

"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att........., 4 pages.
Fleischfresser. Never Stop at a Red-Light Again. Published online Aug. 30, 2011. http://www.smartplanet.com/blog/............, 2 pages.
Cellphone Networks and the Future of Traffic. Published online Mar. 2, 2011. http://m.wired.com/autopia/2011/03/cell-phone-networks-and-the-future-...15 pages.
Intelligent Transportation System. Published online http://en.wikipedia.org/wiki/Intelligent_transportation_system, retrieved on Aug. 15, 2011, 7 pages.
Koukoumidis Emmanouil, Peh Li-Shiuan, Martonosi Margaret, SignalGuru: Leveraging Mobile Phones for Collaborative Traffic Signal Schedule Advisory, MobiSys'11, Jun. 28-Jul. 1, 2011, Bethesda, Maryland, USA. 14 pages.
Bitcarrier Technology. Published online at http://www.bitcarrier.com/technology, retrieved on Aug. 15, 2011, 1 page.
Hao Peng, Ban Xuegang(Jeff). Estimating Vehicle Position in a Queue at Signalized Intersections Using Simple Travel Times from Mobile Sensors, retrieved Nov. 18, 2011. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.

(56) References Cited

OTHER PUBLICATIONS

Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis_pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044110/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., " Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements.
3GPP TS 25.331 V6.9.0 (Mar. 2006) RRC protocol for the UE-UTRAN radio interface.
3GPP TS 25.413 V6.9.0 (Mar. 2006) UTRAN lu interface RANAP signalling.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, Timo Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.

* cited by examiner

LOCATION ANALYTICS EMPLOYING TIMED FINGERPRINT LOCATION INFORMATION

RELATED APPLICATIONS

This application is a continuation of, and claims priority to, U.S. patent application Ser. No. 13/188,345, filed 21 Jul. 2011, entitled "LOCATION ANALYTICS EMPLOYING TIMED FINGERPRINT LOCATION INFORMATION", the disclosure of which is incorporated herein by reference in its entirety.

TECHNICAL FIELD

The disclosed subject matter relates to location analytic technologies and, more particularly, to leveraging timed fingerprint location information to determine compliance status relative to a location analytic boundary condition.

BACKGROUND

Conventionally, location analytics, also known as geofencing, employs conventional location technologies to determine a location of user equipment (UE) relative to a designated boundary condition. Location analytic technologies often rely on location technologies such as global positioning system (GPS) receivers, triangulation or multilateration of wireless radio signals such as cellular signals or access point signals, association with near field communications equipment having a predetermined location, and even from dead reckoning or accelerometer technologies. As such, conventional geofencing technologies generally rely on location systems that can consume significant amounts of energy or can require significant amounts of computation. These aspects of conventional location analytics can draw down mobile equipment batteries at an undesirably fast rate. Further, these aspects of conventional location analytics can consume more computational steps and can result in slower performance for user equipment (UE).

The above-described deficiencies of conventional location analytic technologies are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments of the instant disclosure relate to location analytic technologies employing timed fingerprint location (TFL) technology. Timed fingerprint location technology can be as disclosed in U.S. Ser. No. 12/712,424, the application incorporated in the entirety hereinabove by reference. In one example embodiment, a system comprises a TFL information component to determine a location for a UE based on the TFL information. The exemplary system further comprises a location analytic component to facilitate a determination of a compliance status for a location analytics rule. This compliance can be based on the location of the user equipment.

In another example embodiment, a method comprises receiving timed fingerprint location information. This TFL information can be associated with a UE. The method can further determine compliance with a location analytics rule based on the received timed fingerprint location information.

In another example embodiment, a computing device comprises a processor configured to receive timed fingerprint location information. This TFL information can be associated with a user equipment. The process of is further configured to determine compliance with a location analytics rule based on the TFL information. A status value can be designated based on compliance with the location analytics rule. Further, the processor can facilitate access to the designated status value.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings.

DETAILED DESCRIPTION

Figure 1:
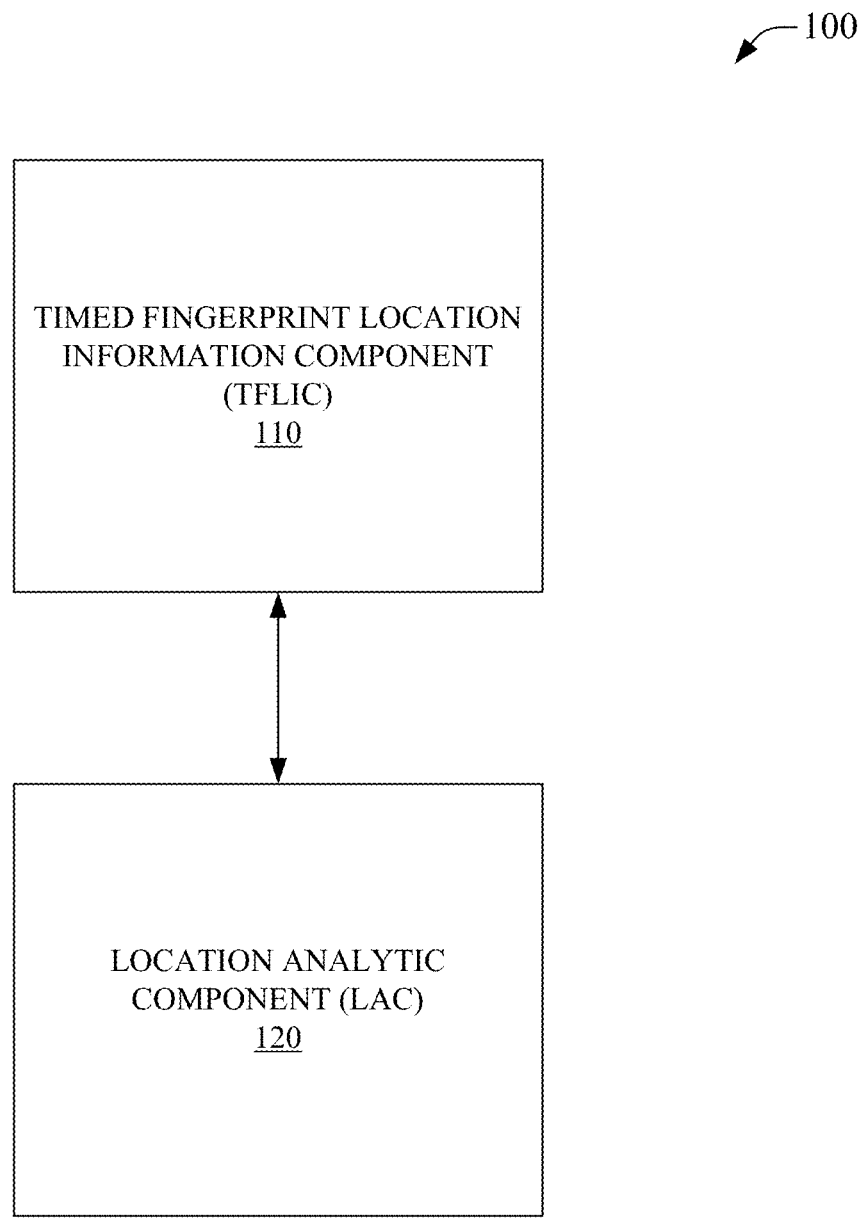
FIG. 1 is an illustration of a system that facilitates employing timed fingerprint location information to determine a compliance status to a location analytics rule in accordance with aspects of the subject disclosure.

In contrast to conventional location analytics technologies, the presently disclosed subject matter illustrates employing timed fingerprint location information to determine a compliance status with a location analytics rule.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, which facilitates employing timed fingerprint location information to determine a compliance status for a location analytics rule in accordance with aspects of the subject disclosure. System 100 can include timed fingerprint location information component (TFLIC) 110. TFLIC 110 can facilitate access to timed fingerprint location (TFL) information. TFL information can include a determined location for a user equipment (UE). In one aspect, a UE can be located using TFL technology as disclosed in the referenced and incorporated application as disclosed hereinabove. This location can be received by TFLIC 110 for use in determining compliance with a geofencing rule. As an example, a TFL enabled cell phone can impinge on a zone around a school and the TFL location of the cell phone can be used to determine the impingement in accordance with the present disclosure. As a second example, a TFL enabled laptop computer can leave a building, the building defining a secure zone in which the laptop should remain, and the TFL location of the laptop can be used to determine that the laptop is outside of the secure zone such that steps can be undertaken to return the laptop to the secure zone.

In an aspect, TFLIC 110 can facilitate access to TFL information. TFL information can be a source of location information for UEs. Moreover, TFL information can be employed at various levels of granularity. Further, TFL information can be employed with little to no additional power consumption. TFL information can provide advantages over GPS-type techniques, near field communication techniques, or proximity sensor techniques and is distinct from these other forms of location determination.

TFL information can include location or timing information as disclosed in more detail in U.S. Ser. No. 12/712,424 filed Feb. 25, 2010, which application is hereby incorporated by reference in its entirety. As such, TFL component 110 can facilitate access to location information for a UE and TFL information can be information from systems in a timed fingerprint location wireless environment, such as a TFL component of a wireless telecommunications carrier. As a non-limiting example, a mobile device, including mobile devices not equipped with a GPS-type system, can be located by looking up timing information associated with the mobile device from a TFL information reference.

In an aspect, TFL information can include information to determine a differential value for a NodeB site pair and a bin grid frame, as disclosed in more detail in incorporated U.S. Ser. No. 12/712,424. A centroid region (possible locations between any NodeB site pair) for an observed time value associated with any NodeB site pair (NBSP) can be calculated and is related to the determined value (in units of chip) from any pair of NodeBs. When UE time data is accessed, a value look-up can be initiated (e.g., a lookup for "DV(?,X)" as disclosed in more detail in the application incorporated herein by reference). Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. As such, employing TFL information for location determination is demonstrably different from conventional location determination techniques or systems such as GPS, eGPS, triangulation or multilateration in wireless carrier environments, near field techniques, or proximity sensors.

In an aspect, TFL information can be particularly well suited to location analytic technologies in that TFL information lookup generally requires less computation that other location technologies. For example, in conventional multilateration systems, complex math is typically employed to convert a plurality of measured signals into a location. In contrast, TFL information is generally pre-computed and could employ simple lookup techniques to garner probable locations of a UE based on overlapping bin grid locations for a plurality of NodeB Site Pairs (NBSPs) as disclosed more fully in the referenced application.

In a further aspect, TFL information can be acquired based on timing signals already being received by a typical UE and, as such, power need not typically be expended on an additional radio receiver as would be common in more conventional location technologies such as GPS. For example, in contrast to a GPS system having a GPS receiver to receive GPS signals, a TFL enabled smartphone can employ wireless radio timing signals associated with the wireless cellular service of the smartphone to determine location such that both location information and cellular service are accommodated on the same radio and additional energy for a second radio need not be expended. As such, TFL information can be well suited to portable user equipment that typically is both highly power conscious and relatively processor limited as compared to their non-mobile counterparts. It is to be appreciated that where the location of a mobile device can be achieved with TFL information without bogging down a processor or further increasing battery depletion in the mobile device, the use of TFL information for location analytics of the mobile device is well suited.

System 100 can further comprise location analytic comportment (LAC) 120. LAC 120 can be coupled to TFLIC 110. As such, LAC 120 can receive location information from TFLIC 110. Location analytic component 120 can determine a compliance status for a location analytics rule based on TFL information. Compliance status can indicate a compliant status or non-compliant status for a given location analytics rule. For example, a rule can be that a UE is not within a predetermined bin grid location "AA"; is not within a predetermined number of meters from a location; is within a predetermined number of units of chip from a predetermined boundary; etc. For each of these exemplary conditions, compliance can be determined, such as, where TFL information indicates that UE is within bin grid location "AA", then the UE is non-compliant with the exemplary geofence rule. Similarly, where TFL information indicates that UE is within the predetermined number of units of chip from a predetermined boundary, then the UE is compliant with the exemplary location analytic rule.

In an aspect, location analytics can be employed to determine when a UE enters a geofenced region, leaves a geofenced region, is in a geofenced region, in not in a geofenced region, is approaching a geofenced region, is becoming more distant from geofenced region, etc. This can occur in 1-dimension, such as determining when a UE is above or below a certain altitude; in 2-dimensions, such as if a UE is approaching a topographical boundary at street level; in 3-dimensions, such as if a UE is leaving a particular floor in an office building; in 4-dimensions, such as determining compliance with a rule as a function of the rate at which a UE is transitioning in three other dimensions, for example, determining that an airplane is descending too rapidly and is thus exceeding a safety performance condition; etc.

In a further aspect, location analytic rules can be of nearly any level of complexity. As such, the use of TFL information can be employed in one or more aspects of determining the status of compliance with a geofencing rule. For example, a geofencing rule can be a compound rule that bases compliance on both location and status of a UE, for example, a UE can be non-compliant where the UE is in an airplane at takeoff and a radio is transmitting signals, while the same UE can be compliant where the UE is in an airplane at takeoff and not transmitting radio signals (e.g. a rule reflecting federal aviation administration rules about turning off all transmitting radio devices for takeoff). Further more or less complex location analytics rules can be readily illustrated but are not explicitly recited here simply for brevity; however, all such examples are considered within the scope of the present disclosure.

In an embodiment, LAC 120 can determine compliance status at one or more levels of certainty in the location of a UE based on TFL information. Whereas a location can be determined with increasing certainty as a function of the number of NBSPs employed in the TFL information, LAC 120 can similarly provide an increasing level of certainty in the compliance status determination as a function of the number of NBSPs employed in the TFL information. For example, where two NBSPs are employed, the likely location, with a first level of certainty, can be based on the overlap of the two centroids, one from each NBSP. In contrast, where five NBSPs are employed, the likely location can be based, with a second level of certainty, on the overlap of the five centroids, one from each NBSP. There can be increased confidence a UE is at the intersection of five centroids as compared to the intersection of two centroids.

In an aspect, TFL can be employed at various levels of granularity. Different TFL information granularities can be associated with different levels of efficiency. For example, a coarse grain TFL location can be based on fewer NBSPs than fine grain TFL information; coarse grain TFL information can be based on shorter timing information than fine grain TFL information (e.g., an 8-bit time compared to a 32-bit time or a 128-bit time, etc.); coarse grain TFL information can include known errors that can be compensated for in fine grain TFL information, etc. Whereas different levels of TFL granularity can be available, TFL lookup can be conducted at a first level of granularity and then at a second level of granularity where a condition is met at the first level of granularity. For example, a coarse TFL granularity can be employed to simply include or exclude a UE within a geofenced region. Where the exemplary UE is found to be included in the geofenced region, fine grain TFL location information can be received to confirm if the UE is indeed within the geofenced region. As a non-limiting illustrative example, a first TFL information can be employed to determine if a UE is within 2 miles of the center of a naval shipyard and, where the UE is at first determined to be outside the two mile region, a second TFL information can be employed to determine that the UE is actually in the shipyard but is located at a boundary gate to the shipyard located at 2.01 miles from the center of the shipyard. This illustrates the use of course and fine grain TFL information. Other examples, though considered to be within the present scope, are not explicitly recited for brevity.

Figure 2:
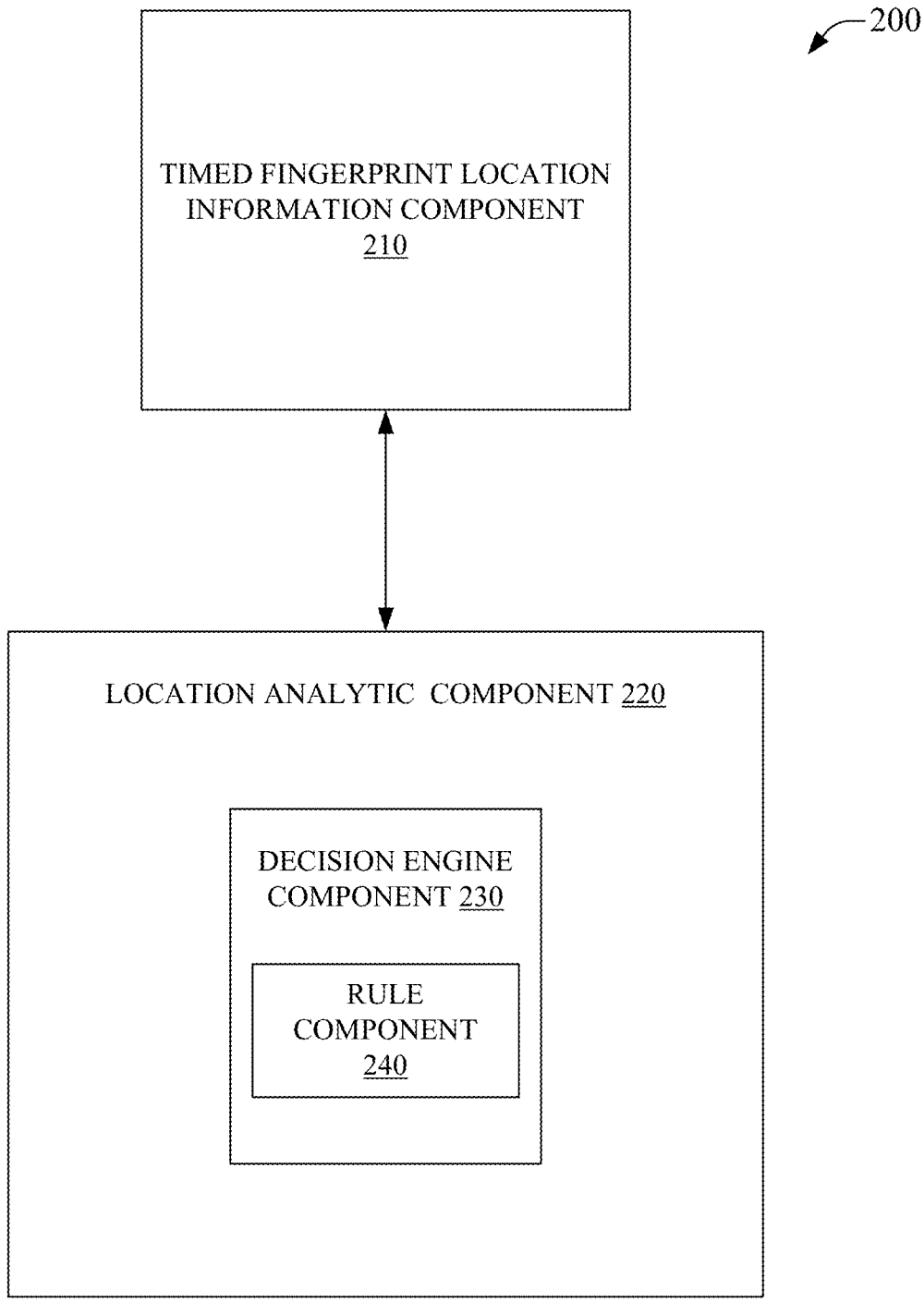
FIG. 2 is a depiction of a system that facilitates employing timed fingerprint location information to determine a compliance status for a location analytics rule in accordance with aspects of the subject disclosure.

FIG. 2 is a depiction of a system 200 that can facilitate employing timed fingerprint location information to determine a compliance status for a location analytics rule in accordance with aspects of the subject disclosure. System 200 can include TFLIC 210. TFLIC 210 can receive TFL information. TFL information can include location information for a UE. TFLIC 210 can be communicatively coupled to LAC 220. LAC 220 can determine a compliance status for a location analytic rule based on the TFL information received at TFLIC 210.

LAC 220 can include decision engine component 230. Decision engine component 230 can facilitate determining a compliance status to a location analytic rule. In an aspect, decision engine component 230 can apply TFL location information to location analytics rules to determine a compliance status. Determinations of compliance status can include determining that a UE is in a region, out of a region, approaching a region, withdrawing from a region, entering a region, exiting a region, etc. For example, where TFL information indicates a UE location as 123 Main St., the UE can be determined to be out of compliance with a location analytics rule reflecting a filed protective order indicating that the registered owner of the UE is directed to not be within 500 feet of 123 Main St.

Decision engine component 230 can include rule component 240 to facilitate receiving a location analytics rule. Rule component 240 can facilitate receiving or generating a location analytics rule. In an embodiment, rule component 240 can be a rule engine that allows the application of logical determinations to be embodied in one or more algorithms related to the analysis of a UE location. As a non-limiting example, rule component 240 can generate a rule that indicates compliance when a UE location, based on TFL information, is not within an establishment registered to serve hard liquor, such as bars having a state issued hard liquor license. This example could then be used in geofencing the owner of the UE from entering hard liquor bars, such as where this behavior is court ordered as part of an alcohol treatment program. As a second non-limiting example, rule component 240 can access a rule that indicates compliance when a UE location, based on TFL information, is inside a predetermined envelope for a route between a designated UE user's home and school, such as to facilitate parental monitoring of a child on their walk to and from school each day. Numerous other examples of rules or logic will be readily appreciated and are considered within the scope of the disclosed subject matter even though they are not explicitly recited herein for brevity and clarity.

Figure 3:
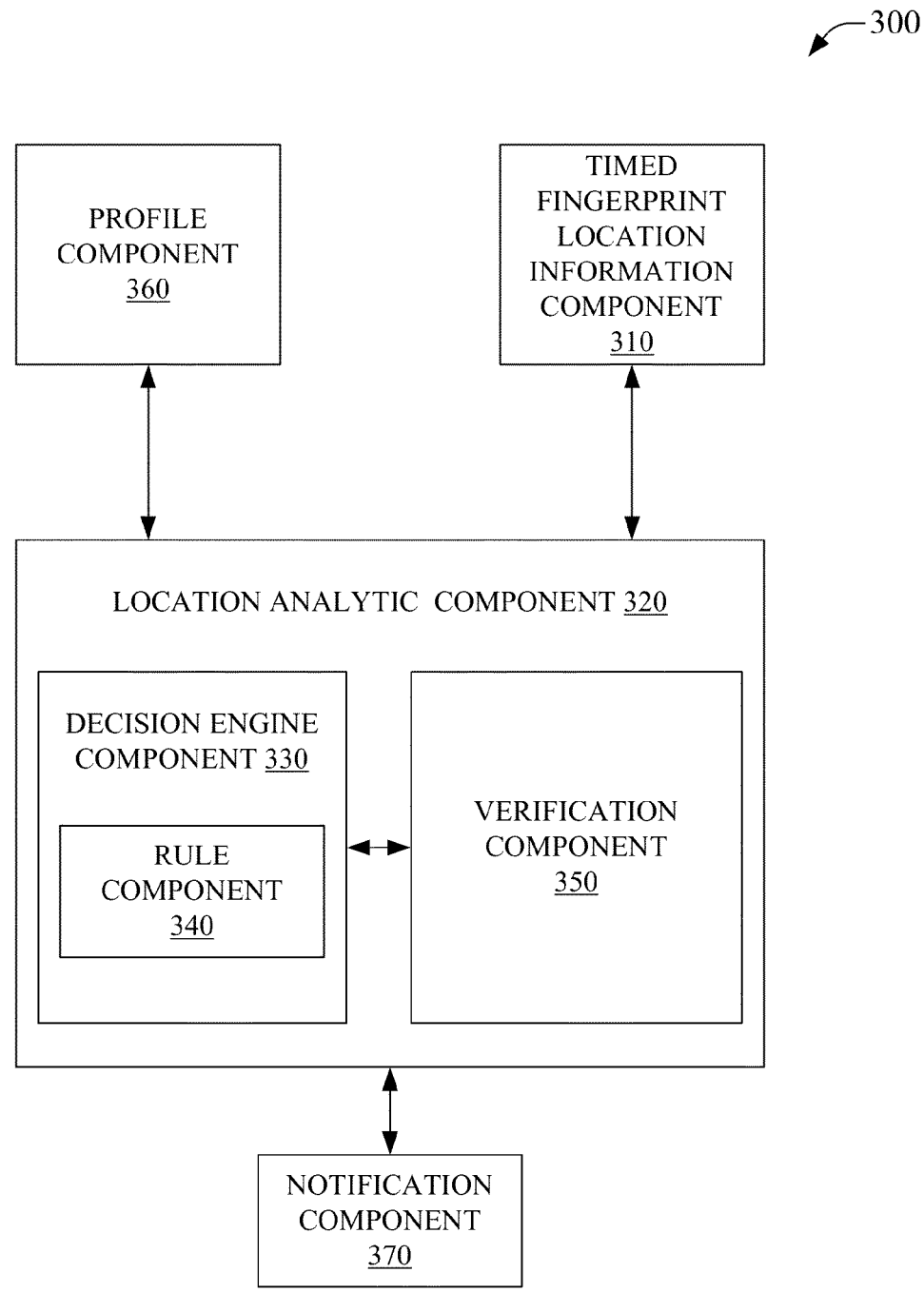
FIG. 3 illustrates a system that facilitates employing timed fingerprint location information to determine a compliance status with a location analytics rule and a verification component to authenticate the identity of an individual in accordance with aspects of the subject disclosure.

FIG. 3 illustrates a system 300 that facilitates employing timed fingerprint location information to determine a compliance status with a location analytics rule and a verification component to authenticate the identity of an individual in accordance with aspects of the subject disclosure. System 300 can include TFLIC 310. TFLIC 310 can receive TFL information. TFL information can include location information for a UE. TFLIC 310 can be communicatively coupled to LAC 320. LAC 320 can determine a compliance status for a location analytic rule based on the TFL information received at TFLIC 310. LAC 320 can include decision engine component 330. Decision engine component 330 can facilitate determining a compliance status to a location analytic rule. Decision engine component 330 can include rule component 340 to facilitate receiving a location analytics rule. Rule component 340 can facilitate receiving or generating a location analytics rule.

System 300 can further include verification component 350. Verification component 350 can facilitate verification of a registered owner or designated user of a UE. Verification can include verification of an identity. For example, verification component 350 can receive biometric information to verify a user of a UE, such as, a voiceprint, an iris scan, a fingerprint, etc. As a second example, verification component 350 can receive information satisfying a predetermined condition to verify a user of a UE, such as, an answer to a predetermined question, entry of a personal identification number (PIN), interaction with a predetermined identifier such as with a credit card or State issued or corporate issued identification card for a user, etc.

In an aspect, verification component 350 can be employed in conjunction with determinations of a compliance status, such as where a UE enters a prohibited geofence location, verification of the user of the UE can be undertaken. For example, where a user is prohibited from entering a gambling establishment and the UE is determined to be at a gambling establishment, an automated phone call for voiceprint verification of the UE user can be employed to verify that the user is at the prohibited location. Where the exemplary user does not engage in the verification process, assumptions can be made about the identity of the UE user.

Verification component 350 can receive identification information by way of profile component 360. Profile component 360 can receive information related to a user of a UE to facilitate identification of the user by way of verification component 350. Examples of profile information can include voiceprints, fingerprints, iris prints, PINs, State issued identification identifiers, credit card information for identification, predetermined questions and appropriate answers for a "call and response" verification system, etc.

Further, in an embodiment, system 300 can include notification component 370. Notification component 370 can facilitate access to notifications related to compliance status and verification status. For example, where a user is talking on a phone and they leave a predetermined geofenced region, verification component 350 can access the telephone call to get a voice sample of the user and can compare that to a voice reference from profile component 360 to verify that the user is indeed collocated with the phone. Notification component can then allow notification of the departure from the geofenced region by the user to be logged. This example can be used to track employees, such as delivery drivers, who are departing from their assigned routes, etc. Examples of a notification component 370 logging compliance status and/or identification verification can readily be stated for employer/employee scenarios, parent/child scenarios, court and law enforcement scenarios, school and truancy scenarios, security scenarios, medical/health scenarios, etc., all of which are to be considered within the scope of the present disclosure even where, for brevity and clarity, further explicit examples are not provided.

Figure 4:
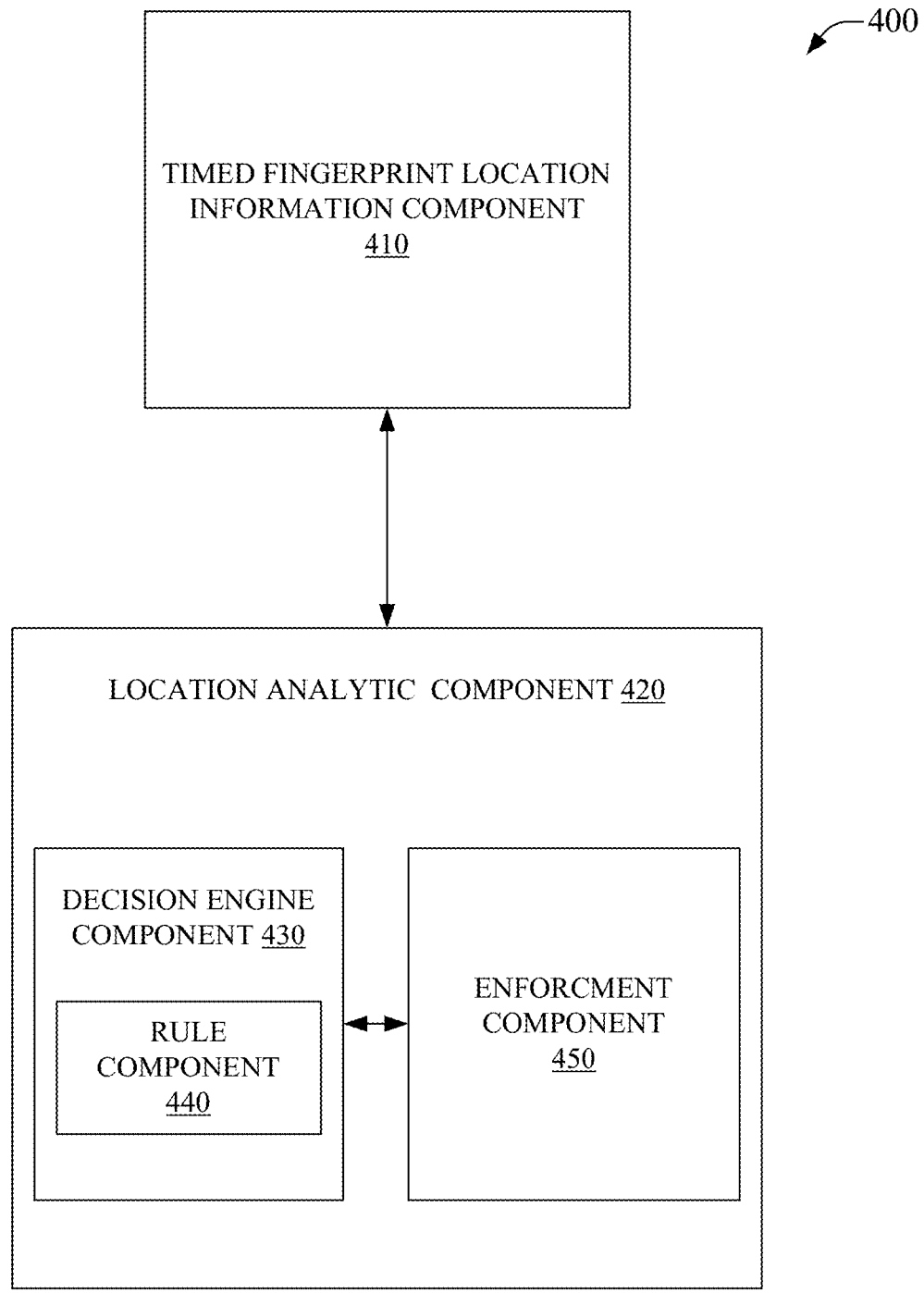
FIG. 4 is a depiction of a system that facilitates employing timed fingerprint location information to determine a compliance status for a location analytics rule and an enforcement component to facilitate implementation of an enforcement technology in accordance with aspects of the subject disclosure.

FIG. 4 is a depiction of a system 400 that facilitates employing timed fingerprint location information to determine a compliance status for a location analytics rule and an enforcement component to facilitate implementation of an enforcement technology in accordance with aspects of the subject disclosure. System 400 can include TFLIC 10. TFLIC 410 can receive TFL information. TFL information can include location information for a UE. TFLIC 410 can be communicatively coupled to LAC 420. LAC 420 can determine a compliance status for a location analytic rule based on the TFL information received at TFLIC 410. LAC 420 can include decision engine component 430. Decision engine component 430 can facilitate determining a compliance status to a location analytic rule. Decision engine component 430 can include rule component 440 to facilitate receiving a location analytics rule. Rule component 440 can facilitate receiving or generating a location analytics rule.

System 400 can further include enforcement component 450. Enforcement component 450 can facilitate enforcing location analytics rules. As such, where compliance status changes are undesirable, enforcement component 450 can implement technologies to promote a status quo for compliance status. Enforcement can be by way of notification of potential or actual changes in compliance status, penalties, fines, alarms, notification of services or authorities, interaction with other devices, etc. For example, where a TFL enabled laptop is approaching a security boundary in a corporate environment (e.g., to prevent laptops with sensitive information from leaving a corporate facility) a phone call or a text message can be sent to the associated user of the laptop to put them on notice that the laptop should not leave the geofenced region. Where the exemplary laptop does leave the region despite the warning, enforcement component 450 can encrypt or destroy sensitive data on the laptop and the user's supervisor can be alerted to the event. Further enforcement can occur as the exemplary scenario develops, such as disabling the user's vehicle to prevent them from driving off the corporate facility with the laptop, etc. As a second non-limiting example, where a UE is determined to be on a plane as it is preparing to taxi for takeoff, the UE can alert the user, then, where no appropriate action is taken by the user, the UE can automatically go into "airplane" mode (e.g., turning off transmitting radios), can initiate a power down sequence, can alert the flight crew, can cause an audible alert or alarm, etc.

Figure 5:
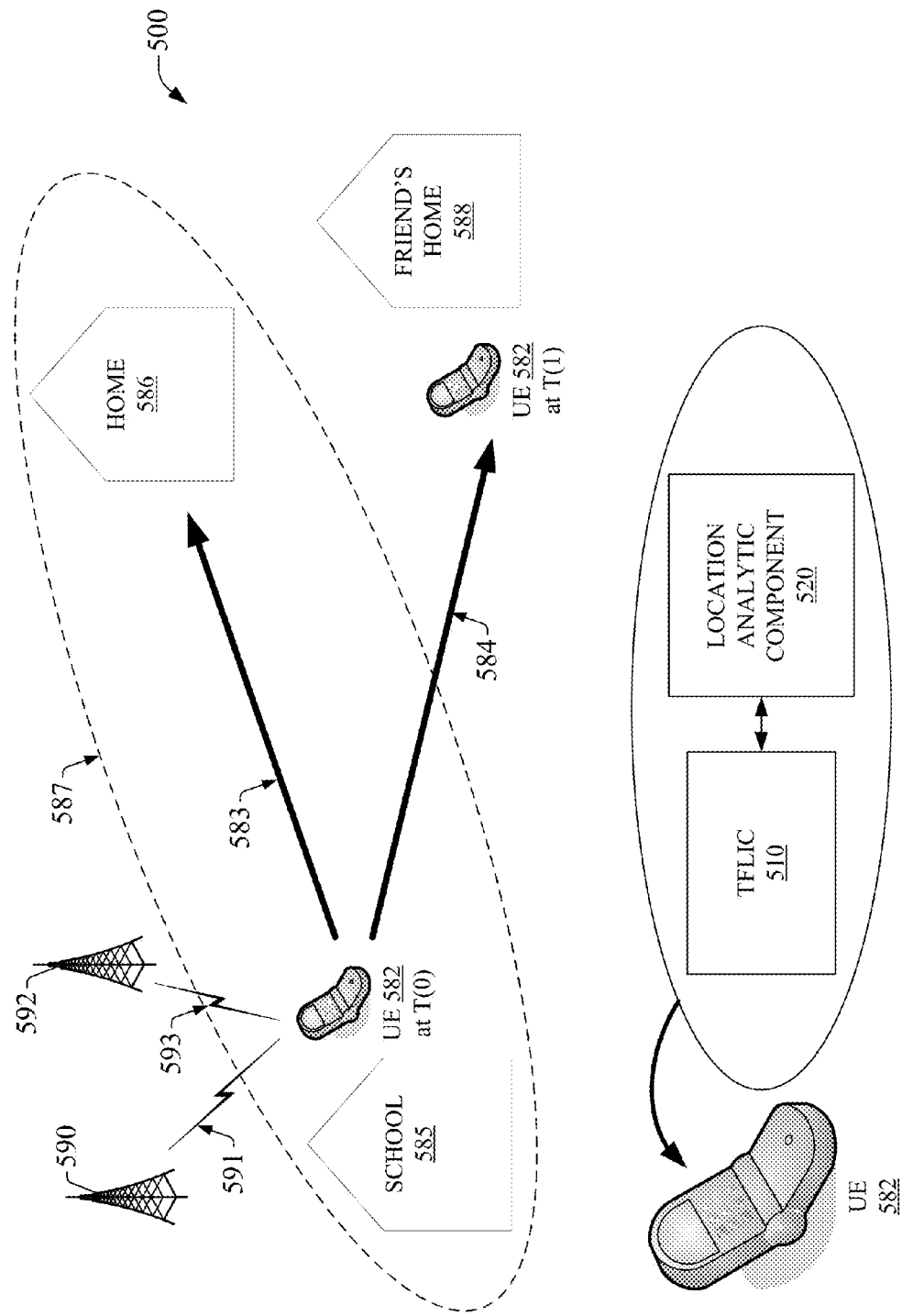
FIG. 5 illustrates a non-limiting exemplary system facilitating employing timed fingerprint location information to determine a compliance status with a location analytics rule in accordance with aspects of the subject disclosure.

FIG. 5 illustrates a non-limiting exemplary system 500 facilitating employing timed fingerprint location information to determine a compliance status with a location analytics rule in accordance with aspects of the subject disclosure. System 500 can include UE 582 that can include TFLIC 510 and LAC 520. TFLIC 510 can facilitate determining the location of UE 582 based on TFL information as disclosed herein.

LAC 520 can facilitate determining a compliance status with a location analytics rule based on the location of UE 582 as disclosed herein.

In exemplary system 500, UE 582 can be, for example, a cell phone belonging to a teenage child. The parents of the child can have designated a region 587 between school 585 and home 586 that the UE would be expected to be in on child's trip home from school along route 583. UE 582 can receive timing signals 591 from a NBSP at 590 and timing signals 593 from NBSP 592. These timing signals can facilitate locating UE 582 by way of TFL technology as disclosed in the incorporated application as mention herein before. In the exemplary system 500, child can deviate from the usual path home along 583 to visit a friend's house 588 by way of route 584 from T(0) to T(1), as illustrated.

TFLIC 510 can receive TFL information by way of signal 591 and 593. This TFL information can be employed to determine the location of UE 582. LAC 520 can determine a compliance status with regard to the location determined from the TFL information. Wherein UE 582 is within region 587, as UE 582 is at T(0), the compliance status can indicate that UE 582 is compliant with a location analytics rule that UE 582 should be in region 587. However, where UE 582 is detected to exit region 587, e.g., between T(0) and T(1), the compliance status can be determined to transition from compliance to non-compliance for the aforementioned location analytics rule.

In response to non-compliance in exemplary system 500, a verification component (not illustrated) can employ verification technologies as disclosed hereinabove. For example, an automated telephone call can be made to UE 582 to verify that child is using UE 582. This can be useful as it associates an identification of a user with the non-compliant UE 582. Thus, if cell phone 582 were stolen, the verification process could indicate that child was not using the device when it left region 587. Further, notification can be sent, for example by a notification component (not illustrated), to child's parents indicating the non-compliant condition. The verification and notification technologies can escalate the response to the non-compliant condition based on subsequent rules. For example, where child authenticates with an "distress or emergency PIN", this can cause an automated "Amber Alert" and notification of law enforcement. As another example, child can indicate that an alternative path, e.g., 584, is being employed and an alternate location analytics region rule can be selected by child's parents for monitoring child on path 584. Numerous other examples of subsequent rules are to be appreciated as being within the scope of the disclosed subject matter although they are not herein explicitly recited.

FIG. 5 is presented only to better illustrate some of the benefits of the presently disclosed subject matter and is explicitly not intended to limit the scope of the disclosure to the various aspects particular to the presently illustrated non-limiting example. In some embodiments, the use of GPS or other location technology can be included as complimentary to TFL information without departing from the scope of the present disclosure. It is noteworthy that GPS or other location information from a UE is not required to determine TFL information as disclosed in the related application. Thus, even where legacy UEs, e.g., UEs without GPS or eGPS capabilities, are included in system 500, the timing information for those legacy devices can be employed in TFL location information determinations. This can be particularly useful in regions that have limited distribution of GPS enabled UEs or where GPS functions poorly due to environmental factors such as urban cores, mountainous regions, etc.

Figure 6:
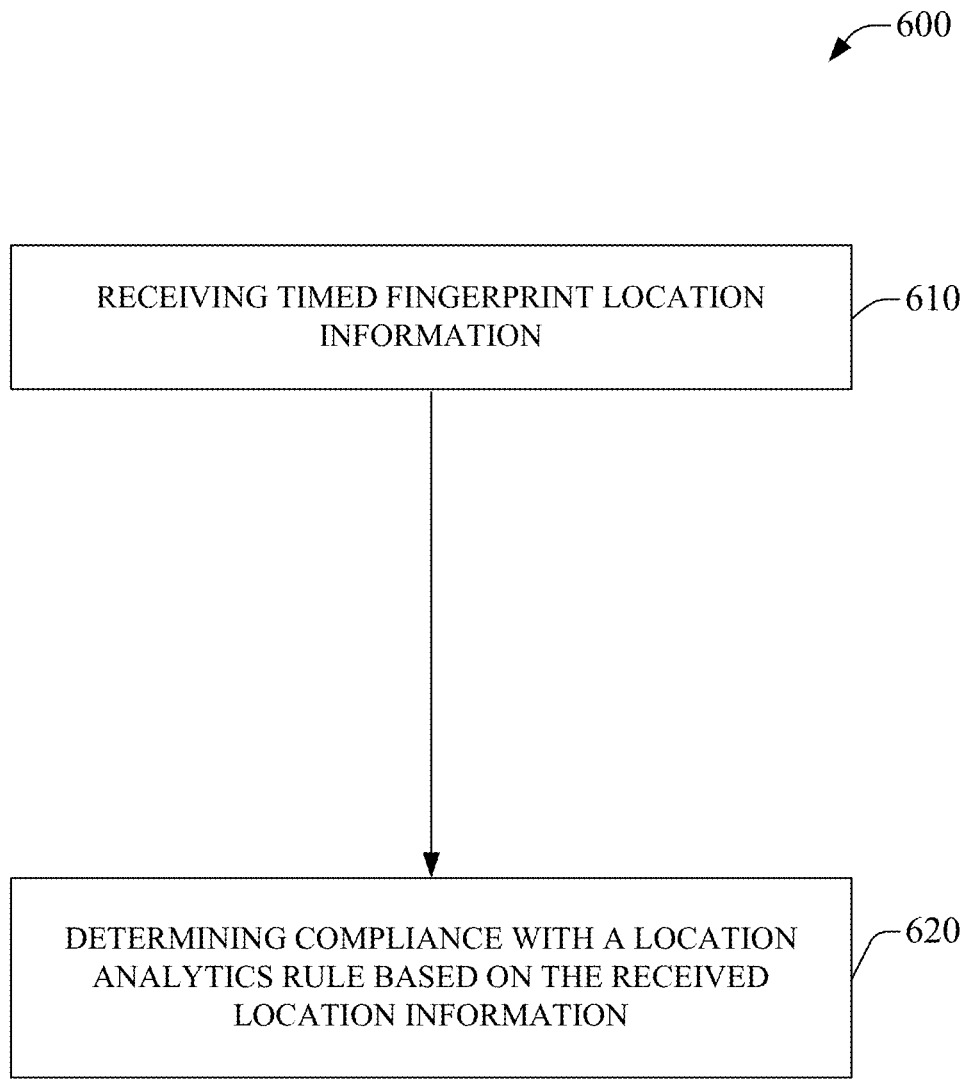
FIG. 6 illustrates a method employing timed fingerprint location information to determine a compliance status for a location analytics rule in accordance with aspects of the subject disclosure.
Figure 7:
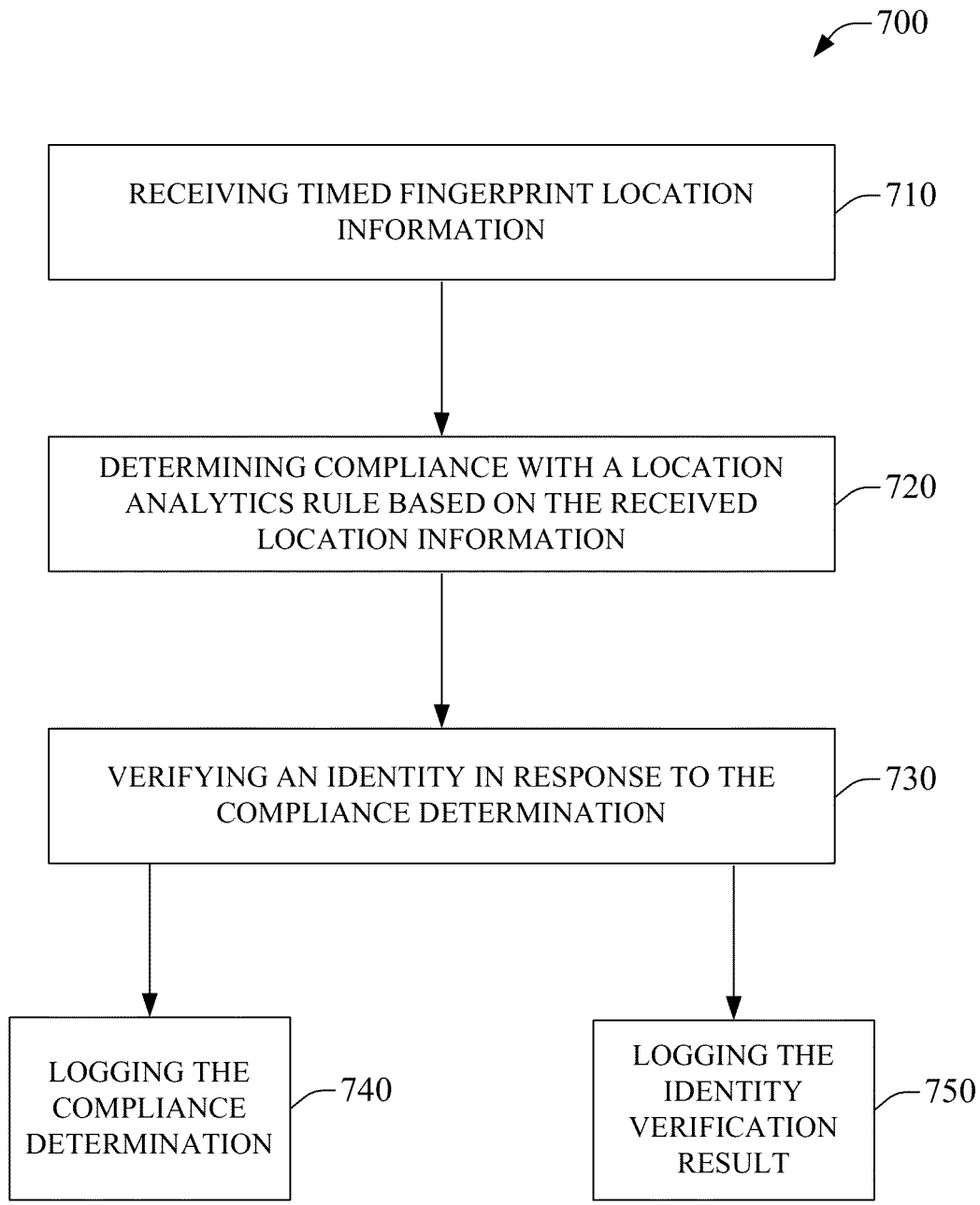
FIG. 7 illustrates a method for employing timed fingerprint location information to determine a compliance status against a location analytics rule and verifying an identity of an individual in accordance with aspects of the subject disclosure.
Figure 8:
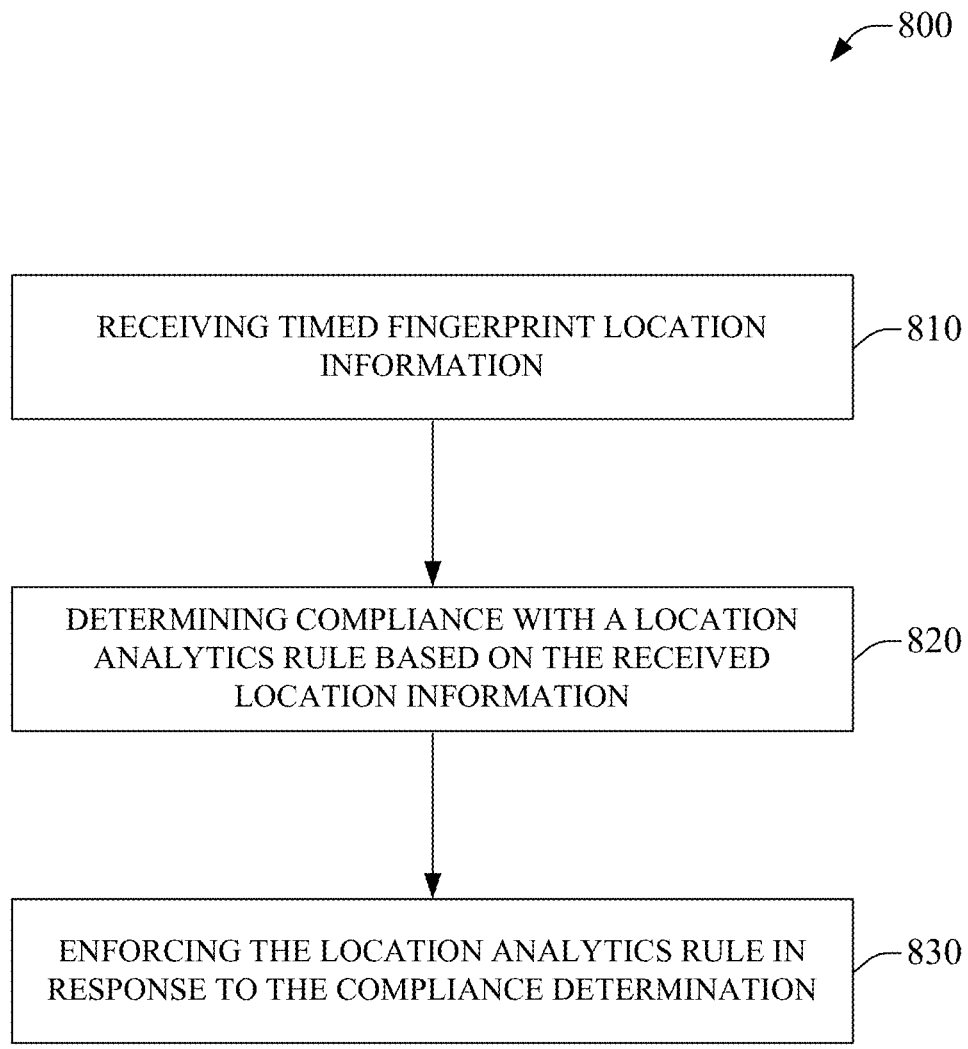
FIG. 8 illustrates a method for facilitating employing timed fingerprint location information to determine a compliance

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 employing timed fingerprint location information to facilitate determining a compliance status for a location analytics rule in accordance with aspects of the subject disclosure. At 610, method 600 can receive timed fingerprint location (TFL) information. TFL information can include a determined location for a UE.

TFL information can further include location information as disclosed in more detail in U.S. Ser. No. 12/712,424 filed Feb. 25, 2010, which application, as previously stated, is hereby incorporated by reference in its entirety. As such, TFL information can include location information for a UE based on timing information. As a non-limiting example, a mobile device, including mobile devices not equipped with a GPS-type system, can be located by looking up timing information associated with the mobile device from a TFL information reference. As such, the exemplary mobile device can be located using TFL information without employing GPS-type techniques. In an aspect, TFL information can include information to determine a DV(?,X). The centroid region (possible locations between any site pair) for an observed time value associated with any NodeB site pair (NBSP) can be calculated and is related to the determined value (in units of chip) from any pair of NodeBs. When UE time data is accessed, a DV(?, X) look-up can be initiated. Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frames locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is most likely in both sets, it is probable that the location for the UE is at the intersection of the two sets. Additional NBSPs can be included to further narrow the possible locations of the UE. Employing TFL information for location determination is demonstrably different from conventional location determination techniques or systems such as GPS, eGPS, triangulation or multilateration in wireless carrier environments, near field techniques, or proximity sensors.

At 620, compliance with a location analytics rule can be determined based on the received TFL location information. At this point, method 600 can end. In an aspect, determining a compliance status can indicate a compliant status or non-compliant status for a given location analytics rule. Further, a compliance status can include determining that a UE is in a region, out of a region, approaching a region, withdrawing from a region, entering a region, exiting a region, etc. Compliance can be based on varying levels of TFL information granularity and in one or more dimensions as previously disclosed. Moreover, location analytics rules can be of nearly any level of complexity and can include rule schemas. A rule schema can designate a series of rule subsets to be analyzed in a predetermined order. For example, a rule schema can designate that coarse grain TFL information be employed, then where a predetermined condition is met, that finer grain TFL information be used, where the fine grain TFL information analysis satisfies a predetermined condition, a particular series of authentication and notification methods can be applied.

As an example of method 600, a TFL enabled delivery vehicle can become mired in traffic. The location of the vehicle in four dimensions, e.g., x, y, z, and time, can be determined from TFL information. A location analytics rule can be related to compliance with the vehicle traversing a predetermined path in a particular time frame to successfully deliver a package in a timely manner. Compliance with this exemplary rule can be determined from the TFL information. Where the vehicle is determined to be noncompliant, e.g., the location and time of the vehicle indicate that the package will not be delivered in a timely fashion, notification can be sent to the intended recipient of the package indicating a likely tardy delivery and to the fleet manager. Numerous other examples are readily apparent and are not herein explicitly included for brevity and clarity, though all such examples are within the scope of the subject material.

FIG. 7 illustrates a method 700 for employing timed fingerprint location information for determining a compliance status against a location analytics rule and verifying an identity of an individual in accordance with aspects of the subject disclosure. At 710, method 700 can receive timed fingerprint location (TFL) information. TFL information can include a determined location for a UE. At 720, compliance with a location analytics rule can be determined based on the received TFL location information.

At 730, the identification of a user can be verified in response to the compliance determination. Verification technologies can include biometrics, passwords, PINs, catechistic question and answer sets, etc. For example, an identity can be verified by an iris scan, a voiceprint match, fingerprint, correctly answering a predetermined security question, scanning a corporate identity card, scanning a credit card, etc. Verification of a user can be desirable to correlate the location of a user the TFL location of a UE. For example, where location analytics employing TFL information is employed in enforcing home arrest, if the UE leaves the predetermined compliance region around the home, verifying that the user of the UE is with the UE can be an important consideration.

At 740, the determined compliance condition can be logged. Similarly, at 750, the identification verification result can be logged. At this point, method 700 can end. Logging compliance and identity verification information can facilitate formulating exception reports for management of location analytics subscribers. For example, a report can be sent to a parent indicating the number of times a high school aged child left campus in a week, month, quarter, year, etc. Similarly, a parole enforcement office can access logs of compliance data for a parolee indicating, for example, the number of times a parolee was near a bar, gambling establishment, school zone, playground, etc.

FIG. 8 illustrates a method 800 for facilitating employing timed fingerprint location information in determining a compliance status for a location analytics rule and applying an enforcement technology in accordance with aspects of the subject disclosure. At 810, method 800 can receive timed fingerprint location information. TFL information can include a determined location for a UE. At 820, compliance with a location analytics rule can be determined based on the received TFL location information.

At 830, conditions of a location analytics rule can be enforced. This can be in response to the determination of compliance at 820. At this point, method 800 can end. Enforcing a location analytics rule can include, for example, alerts or notifications, penalties, alarms, interaction with other user equipment, inclusion of supervisory parties or law enforcement, etc. For example, where a pedophile on parole is violating a location analytics rule by being within 100 feet of a playground, notification can be sent to the pedophile's UE to immediately withdraw from the area. Where withdrawal does not quickly occur, the process can escalate to sounding an audible alarm on the pedophile's UE and sending text messages to UEs of parents in the vicinity of the playground to keep a close eye on children. Moreover, law enforcement can be alerted to the proximity of the pedophile to the playground and the violation of the condition can be logged with a relevant parole officer. As a second example, where a UE with a camera, e.g., most modern phones, enters a photo-restricted region of a military base, enforcement can include notifying the owner of the UE, notification of military law enforcement as to the condition, disabling the UE camera functionality, assessing a fine to the owner's account for violating the location analytics rule, etc.

Figure 9:
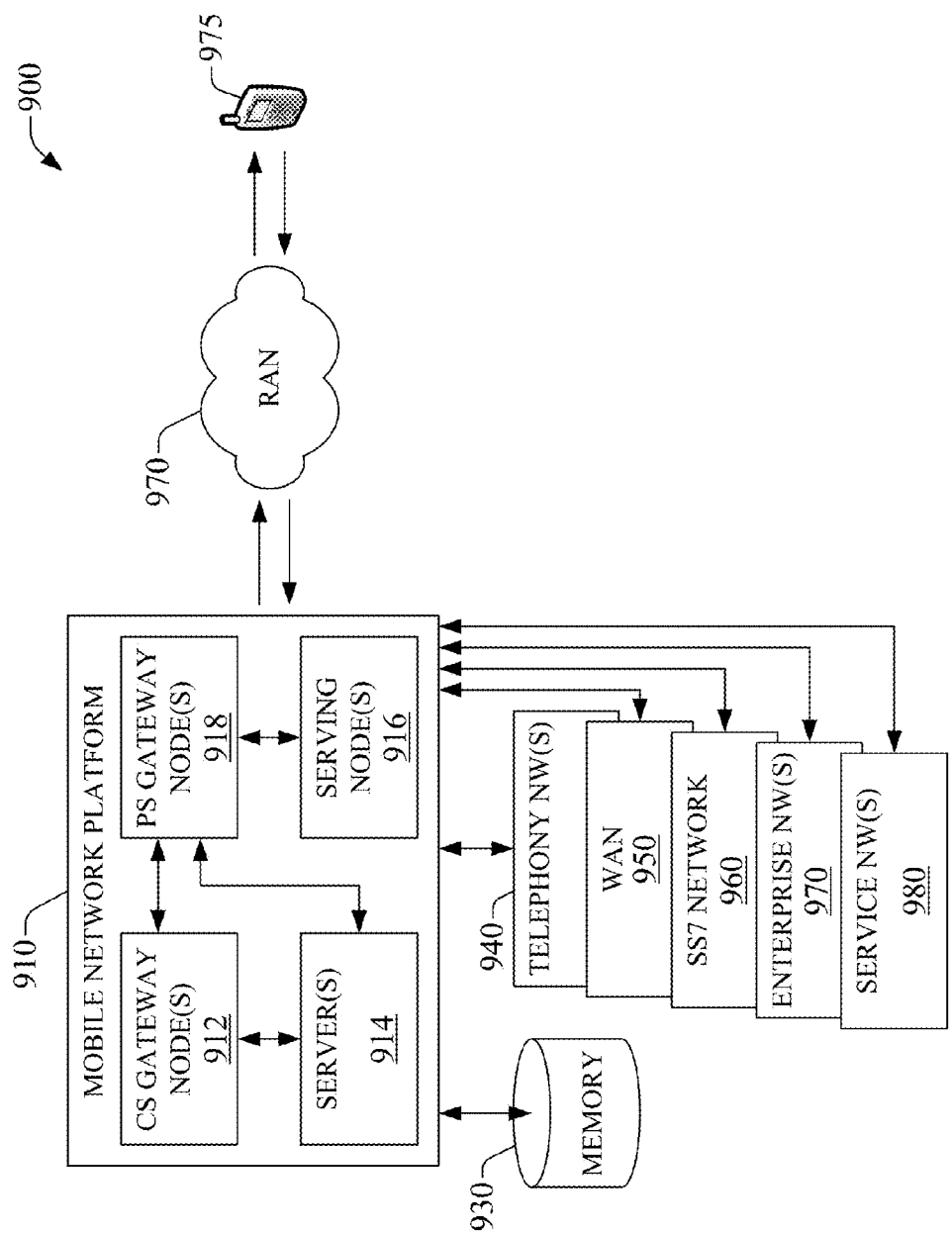
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the subject innovation described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included as part of a telecommunications carrier network, including telecommunications carrier networks employing timed fingerprint location environments. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology (ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows, including receiving timing information for radio communication with wireless network platform resources, e.g., NodeBs, related to TFL technologies and, as such, facilitate generation of TFL information. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
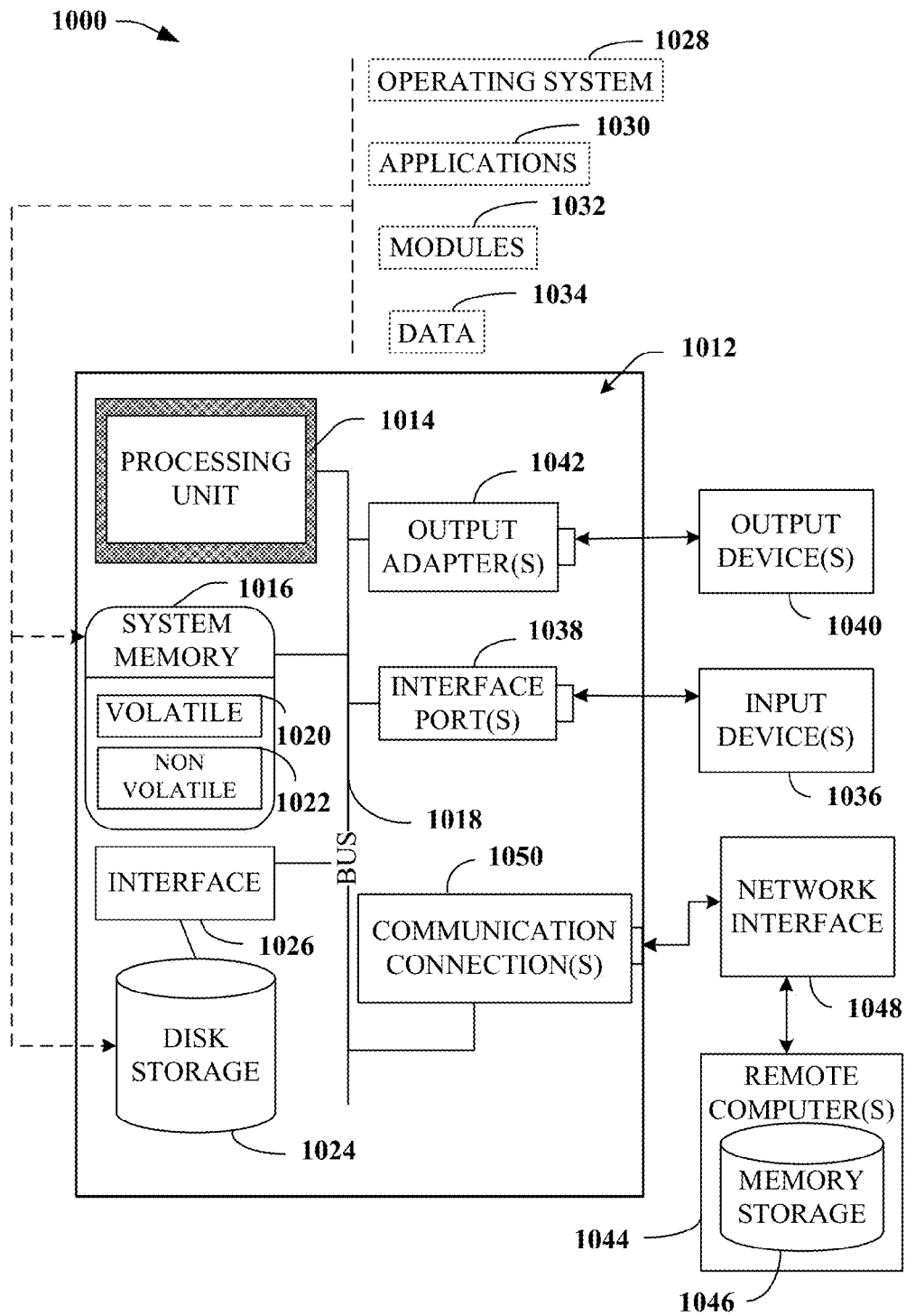
FIG. 10 illustrates a block diagram of a computing system operable to execute the disclosed systems and methods in accordance with an embodiment.

FIG. 10 illustrates a block diagram of a computing system 1000 operable to execute the disclosed systems and methods in accordance with an embodiment. Computer 1012, which can be, for example, part of location analytic component 120 or timed fingerprint location information component 110, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/nonvolatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026. For example, disk storage 1024 can store one or more TFL lookup tables facilitating lookup of location information based on NodeB site pairs and time values, location analytics rules or algorithms, enforcement enabling technologies, etc.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028 (e.g., OS component(s) 312, etc.) Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024.

It is to be noted that the disclosed subject matter can be implemented with various operating systems or combinations of operating systems.

A user can enter commands or information into computer 1011 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the term "core-network", "core", "core carrier network", or similar terms can refer to components of a telecommunications network that typically providing some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femtocell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining a location of a user equipment based on timed fingerprint location information, wherein the timed fingerprint location information represents a first granularity of location information and comprises a first differential timing measurement for a NodeB site pair comprising a first NodeB device and a second NodeB device and a second differential timing measurement for another NodeB site pair comprising a third NodeB device and a fourth NodeB device, and wherein the first differential timing measurement is correlated to a first set of location information for a first substantially hyperbola-shaped geographic region and the second differential timing measurement is correlated to a second set of location information for a second substantially hyperbola-shaped geographic region, to facilitate the determining the location of the user equipment based on the first set of location information and the second set of location information;
      determining compliance data representing a compliance status for a location analytics rule based on the location of the user equipment; and
      confirming the compliance status based on a subsequent location determined for the user equipment based on a second granularity of subsequent location information comprised in subsequent timed fingerprint location information, the second granularity being different than the first granularity.

2. The system of claim 1, wherein the determining the location of the user equipment is based on timed fingerprint location information comprising a third differential timing measurement for a third NodeB site pair comprising a fifth NodeB device and a sixth NodeB device, and wherein the third differential timing measurement is correlated to a third set of location information for a third substantially hyperbola-shaped geographic region to facilitate the determining the location of the user equipment based on the first set of location information, the second set of location information, and the third set of location information.

3. The system of claim 1, wherein the determining the compliance data determines compliance with the location analytics rule.

4. The system of claim 1, wherein the determining the compliance data determines non-compliance with the location analytics rule.

5. The system of claim 1, wherein the determining the compliance data comprises determining a time that compliance with the location analytics rule occurs.

6. The system of claim 1, wherein the determining the compliance data comprises determining an elapsed time of compliance with the location analytics rule.

7. The system of claim 1, wherein the determining the compliance data comprises determining a compliance margin related to the location analytics rule.

8. The system of claim 1, wherein the NodeB site pair and the other NodeB site pair share a NodeB device.

9. A method, comprising:
   receiving, by a system comprising a processor, timed fingerprint location information associated with a user equipment;
   determining, by the system, a location of the user equipment based on timed fingerprint location information, wherein the timed fingerprint location information comprises a first differential timing measurement for a first NodeB site pair comprising a first NodeB device and a second NodeB device and a second differential timing measurement for a second NodeB site pair comprising a third NodeB device and a fourth NodeB device, and wherein the first differential timing measurement is correlated to a first set of location information for a first substantially hyperbola-shaped geographic region and the second differential timing measurement is correlated to a second set of location information for a second substantially hyperbola-shaped geographic region, to facilitate the determining the location of the user equipment based on the first set of location information and the second set of location information; and
   determining, by the system, compliance with a compliance metric of a location analytics rule based on the timed fingerprint location information, wherein an initial location determination of the user equipment is based on initial timed fingerprint location information representing a first granularity of location information, wherein the timed fingerprint location information further represents a second granularity of location information different from the first granularity, and wherein the compliance status is confirmed based on a subsequent location determination of the user equipment based on the second granularity represented by the timed fingerprint location information.

10. The method of claim 9, wherein the determining the location of the user equipment is based on timed fingerprint location information comprising an additional differential timing measurement for a another NodeB site pair to facilitate the determining the location of the user equipment based on the first, the second, and an additional set of location information.

11. The method of claim 9, wherein the determining the compliance determines positive compliance with the location analytics rule.

12. The method of claim 9, wherein the determining the compliance determines negative compliance with the location analytics rule.

13. The method of claim 9, wherein the determining the compliance comprises determining, by the system, a time that compliance with the location analytics rule occurs.

14. The method of claim 9, wherein the determining the compliance comprises determining, by the system, an elapsed time of compliance with the location analytics rule.

15. A non-transitory computer readable storage medium having instructions stored thereon that, in response to execution, cause a system comprising a processor to perform operations, comprising:

receiving timed fingerprint location information associated with a user equipment, wherein the timed fingerprint location information comprises a first differential timing measurement for a NodeB site pair comprising a first NodeB device and a second NodeB device and a second differential timing measurement for another NodeB site pair comprising a third NodeB device and a fourth NodeB device, and wherein the first differential timing measurement is correlated to a first set of location information for a first substantially hyperbola-shaped geographic region and the second differential timing measurement is correlated to a second set of location information for a second substantially hyperbola-shaped geographic region;

processing the timed fingerprint location information to determine a compliance with a location analytics rule based on a location of the user equipment determined from timing information associated with the user equipment and the timed fingerprint location information, wherein the location of the user equipment is determined from the timed fingerprint location information representing a first granularity of location information and updated timed fingerprint location information represents a second granularity of location information different from the first granularity;

designating a status value based on the determining the compliance with the location analytics rule, wherein the status value is based on a subsequent location determination of the user equipment based on the second granularity of location information; and facilitating access to the status value by a component configured to enforce the compliance by way of an enforcement protocol.

16. The non-transitory computer readable storage medium of claim 15, wherein the designating the status value comprises designating a value representing non-compliance with the location analytics rule.

17. The non-transitory computer readable storage medium of claim 15, wherein the processing the timed fingerprint location information to determine the compliance comprises determining a value representing a magnitude by which a trigger value related to the location analytics rule is transitioned.

18. The non-transitory computer readable storage medium of claim 15, wherein the NodeB site pair and the other NodeB site pair share a NodeB device.

19. The non-transitory computer readable storage medium of claim 15, wherein the determining the compliance comprises determining a time that compliance with the location analytics rule occurs.

20. The non-transitory computer readable storage medium of claim 15, wherein the determining the compliance comprises determining an elapsed time of compliance with the location analytics rule.

* * * * *